(12) United States Patent
Williams

(10) Patent No.: US 8,351,089 B2
(45) Date of Patent: Jan. 8, 2013

(54) OPTICAL CODE READER

(75) Inventor: Christopher Hugh Williams, Essex (GB)

(73) Assignee: Neopost Technologies, Bagneux (FR)

( * ) Notice: Subject to any disclaimer, the term of this patent is extended or adjusted under 35 U.S.C. 154(b) by 592 days.

(21) Appl. No.: 12/485,501

(22) Filed: Jun. 16, 2009

(65) Prior Publication Data
US 2009/0316220 A1 Dec. 24, 2009

(30) Foreign Application Priority Data

Jun. 24, 2008 (GB) .................................. 0811558.6

(51) Int. Cl.
H04N 1/04 (2006.01)
(52) U.S. Cl. ........ 358/474; 358/462; 358/464; 358/473; 235/461; 235/462.01; 235/462.14; 235/462.42; 235/462.44
(58) Field of Classification Search .................. None
See application file for complete search history.

(56) References Cited

U.S. PATENT DOCUMENTS

| | | | | |
|---|---|---|---|---|
| 3,737,629 A * | 6/1973 | See | ................ | 250/566 |
| 4,479,194 A * | 10/1984 | Fogg et al. | .................... | 235/386 |
| 4,919,799 A * | 4/1990 | Menardi et al. | ............... | 209/538 |
| 5,008,520 A | 4/1991 | Georgiou et al. | | |
| 5,157,243 A * | 10/1992 | Ramsey | ......................... | 235/376 |
| 5,479,002 A | 12/1995 | Heiman et al. | | |
| 5,796,490 A * | 8/1998 | Shidara et al. | .................. | 358/296 |
| 5,805,740 A * | 9/1998 | Takagi et al. | .................. | 382/257 |
| 5,966,221 A * | 10/1999 | Tellam et al. | .................. | 358/475 |
| 6,135,352 A * | 10/2000 | Girotti | .......................... | 235/454 |
| 6,198,506 B1 * | 3/2001 | Nakata et al. | ............... | 348/222.1 |
| 6,371,371 B1 * | 4/2002 | Reichenbach | ................. | 235/454 |
| 6,431,450 B1 * | 8/2002 | Lundahl et al. | ........... | 235/462.43 |
| 6,502,750 B1 * | 1/2003 | Barnes et al. | ............. | 235/462.01 |
| 6,659,350 B2 * | 12/2003 | Schwartz et al. | ......... | 235/462.42 |
| 6,983,886 B2 * | 1/2006 | Natsukari et al. | .......... | 235/462.1 |
| 7,128,266 B2 | 10/2006 | Zhu et al. | | |
| 7,159,779 B2 * | 1/2007 | DiCristina et al. | ........ | 235/462.14 |
| 8,113,430 B2 * | 2/2012 | Oliva et al. | ............... | 235/462.35 |
| 2002/0040933 A1 | 4/2002 | Gehring et al. | | |
| 2003/0102379 A1 * | 6/2003 | Tsikos et al. | ............. | 235/462.45 |
| 2008/0135621 A1 * | 6/2008 | Tsikos et al. | ............. | 235/462.42 |
| 2008/0156876 A1 * | 7/2008 | Vinogradov | .............. | 235/462.01 |

FOREIGN PATENT DOCUMENTS

| | | |
|---|---|---|
| EP | 0 851 206 A1 | 7/1998 |
| EP | 1 873 682 A2 | 1/2008 |
| GB | 2 236 002 A | 3/1991 |
| JP | 1-156884 A | 6/1989 |
| JP | 08153150 A * | 6/1996 |
| JP | 10-187877 A | 7/1998 |

* cited by examiner

Primary Examiner — Dung Tran
(74) Attorney, Agent, or Firm — Sughrue Mion, PLLC

(57) ABSTRACT

A system for capturing an image of an optical code located at a region of interest in a document, the system comprising: a support for supporting the document; a source of light arranged to illuminate the document; a mount for supporting an imaging device at a position spaced from the document; a trigger for activating the imaging device to capture an image of the region of interest; and a moving device for automatically moving the mount and operating the trigger in dependence upon at least one coordinate identifying the region of interest, the coordinate being contained in a label stored in document parameters.

15 Claims, 3 Drawing Sheets

OPTICAL CODE READER

The present invention relates to a system for reading optical codes and particularly to systems for illuminating and for imaging optical codes.

Optical codes are used in many production industries, for example to convey information or machine control data along a production line, particularly to ensure accurate association of that information or control data with a particular item being processed. For example, a control code printed on a letter might control a printer to cause it to print a selected message on a corresponding envelope depending upon the control code. Alternatively a control code may determine how many and/or which inserts are attached to the letter.

Optical codes can take many forms including Optical Mark Reading (OMR) codes which comprise relatively simple lines positioned at specific places on a document, and Optical Character Reading (OCR) codes which comprise textual information.

Other common optical codes include a Barcode, which is a one-dimensional array of lines of different widths and separations, and 2D Labels which are two-dimensional barcode type patterns.

Optical code reading devices are known for each of these types of code. For example U.S. Pat. No. 5,008,520 describes a barcode reader using a fixed scanner generating a very narrow light beam. U.S. Pat. No. 5,157,243 describes a barcode scanner using a moving beam which scans each code twice to achieve reliable results. However these readers rely on the code being accurately located in a specific predetermined position on a document and being arranged in a predetermined orientation. When a barcode is in a different position complex and time consuming manual adjustment of the position of the scanning head is needed.

Camera systems are known, such as in U.S. Pat. No. 7,128,266, which can capture an image of an optical code anywhere on a document. The image is subsequently decoded and with the right software a camera system can read any optical code. However for a camera to capture an image clearly enough for accurate decoding, the code must be well and uniformly illuminated, and it is necessary to move illumination and camera to align with the position of the code and to focus the camera lens. This is complex and time consuming and requires skilled technical ability. It is not suitable for a fast moving production line, nor for documents with a plurality of codes printed at several positions on a document.

An ideal production system should have the facility to read any code type, preferably up to about 100 mm long, positioned anywhere on the document, and in any orientation. Preferably an ideal system should also be capable of reading the codes fast, since modern paper handling machines have a document throughput of up to 4 meters per second.

According to one aspect of the present invention there is provided a system for capturing an image of an optical code located at a region of interest in a document, the system comprising: means for supporting the document; a source of light, arranged to illuminate the document; a mount for supporting an imaging device at a position spaced from the document; a trigger for activating the imaging device to capture an image of the region of interest; means for automatically moving the mount and operating the trigger in dependence upon at least one coordinate identifying the region of interest, the coordinate being contained in a label stored in document parameters; and means for decoding the captured image to read the optical code.

According to a second aspect of the invention there is provided a source of light, arranged to illuminate at least part of a document comprising a region of interest, the source being arranged to illuminate the part of the document uniformly in first and second regions at opposite side margins of the document and in a third region comprising a band joining the side margins. This light source may be used as the light source of the imaging system.

The document parameters may be printed on the document and read by a sensor upstream of the imaging system. More often they will be incorporated into the overall machine control software and can be selected from a menu by the operator for any particular production run, or entered by an operator and retained by the software for use.

The imaging device may be a camera. The mount for the camera may be attached to a cross-drive mechanism arranged to drive the mount to the correct position so that the camera can record a clear and focused image of the optical code without any further adjustment. To this end the label in the document parameters comprises x and y coordinates of the position of the optical code in the document, i.e. the region of interest. The y coordinate is used to control the trigger to record the image at the correct position longitudinally of the document, while the x coordinate is used to control the cross-drive mechanism to position the camera at the correct distance from the edge of the document.

Preferably the document is supported on a moving conveyor belt.

In one embodiment the source of light is fixed and arranged to provide uniform illumination along the edges of the conveyor belt to illuminate the side margins of the document, and advantageously also in a region extending in a band across the middle of the conveyor belt so that the illumination falls uniformly in an "H" shape. In this context the "H" shape is used generally to indicate a shape with two side bars and a joining bar but the joining bar may be anywhere within the shape and not necessarily in the middle of the shape. As the document passes it will illuminate all parts of the document on the conveyor belt. Preferably the light sources comprise light emitting diodes (LED's).

For a better understanding of the present invention and to show how the same may be carried into effect, reference will now be made, by way of example, to the accompanying drawings in which.

Figure 1:
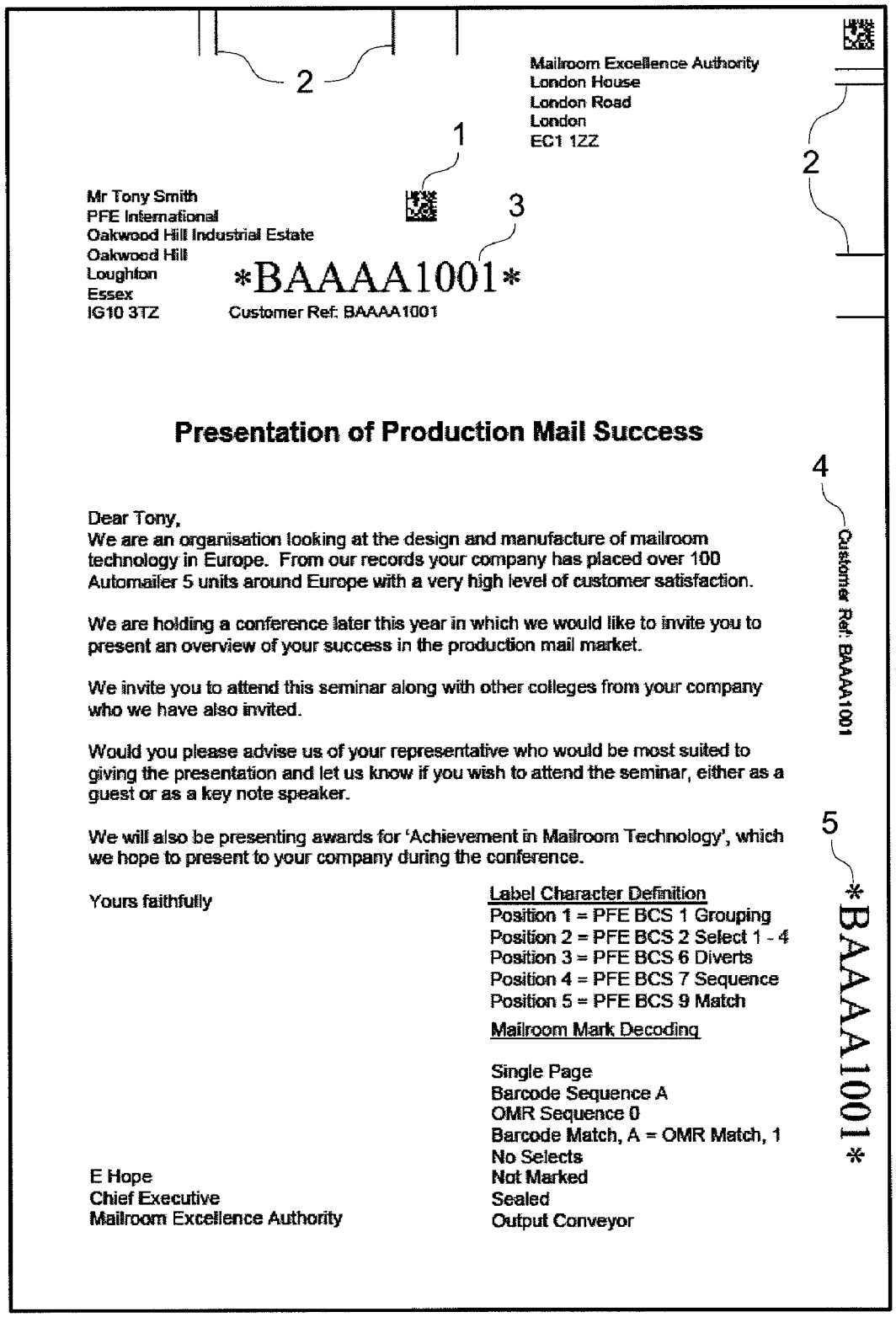
FIG. 1 is an example of a document embodying optical codes to be read by the system of the invention.

FIG. 1 shows a letter printed with various examples of optical codes in a variety of positions. At the top centre is a 2D barcode 1; OMR marks 2 are at the top and in the right hand margin; and OCR marks comprising a customer reference are positioned at 3 at the top of the letter, and at 4 and 5 in the right hand margin of the letter.

These marks determine the way in which the production line handles the letter, for example if it is a single sheet letter or one sheet of several, whether any attachments are to be included, what path in the production line the letter follows, whether the envelope is to be sealed and which conveyor is used for its exit from the production line.

Figure 2:
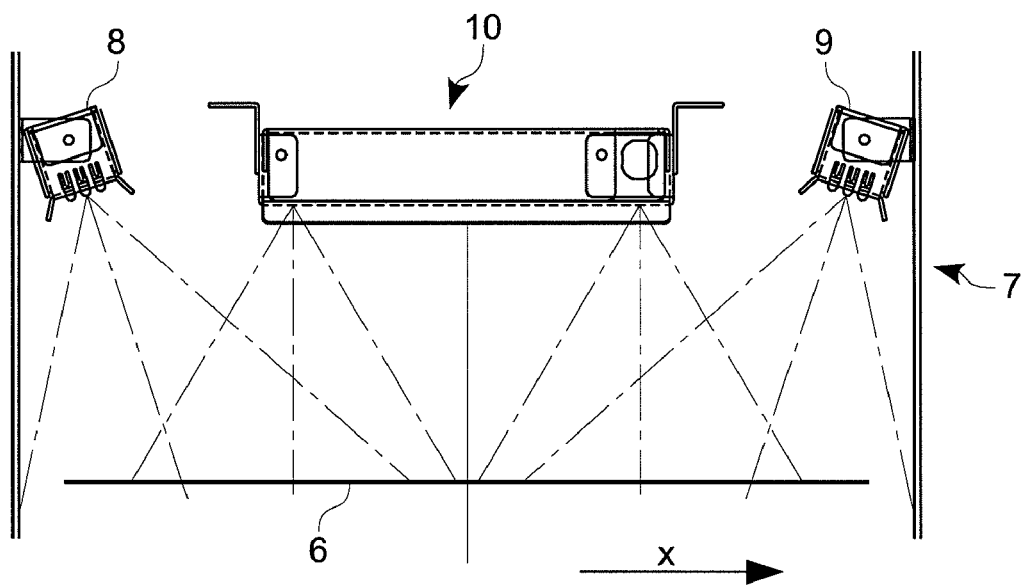
FIG. 2 is a cross sectional view of part of a system according to the invention.

FIG. 2 is a cross section of an illumination module 17. The document 6 is transported by a conveyor belt (not shown) and enters the imaging station 7. Here it is illuminated in a uniform manner by a first left side, light source 8 and a second right side, light source 9. There is also a third light source 10 positioned between the left and right side sources. Each light source comprises an elongate array. The first and second light arrays are parallel to each other and to the direction of travel of the document. The third light array 10 is arranged perpendicular to the first and second arrays. Each array comprises a plurality of LED's, for example 72 LED's. All three light arrays 8,9 and 10 are fixed in position and angled to maximize the illumination of the document in a uniform manner.

Figure 3:
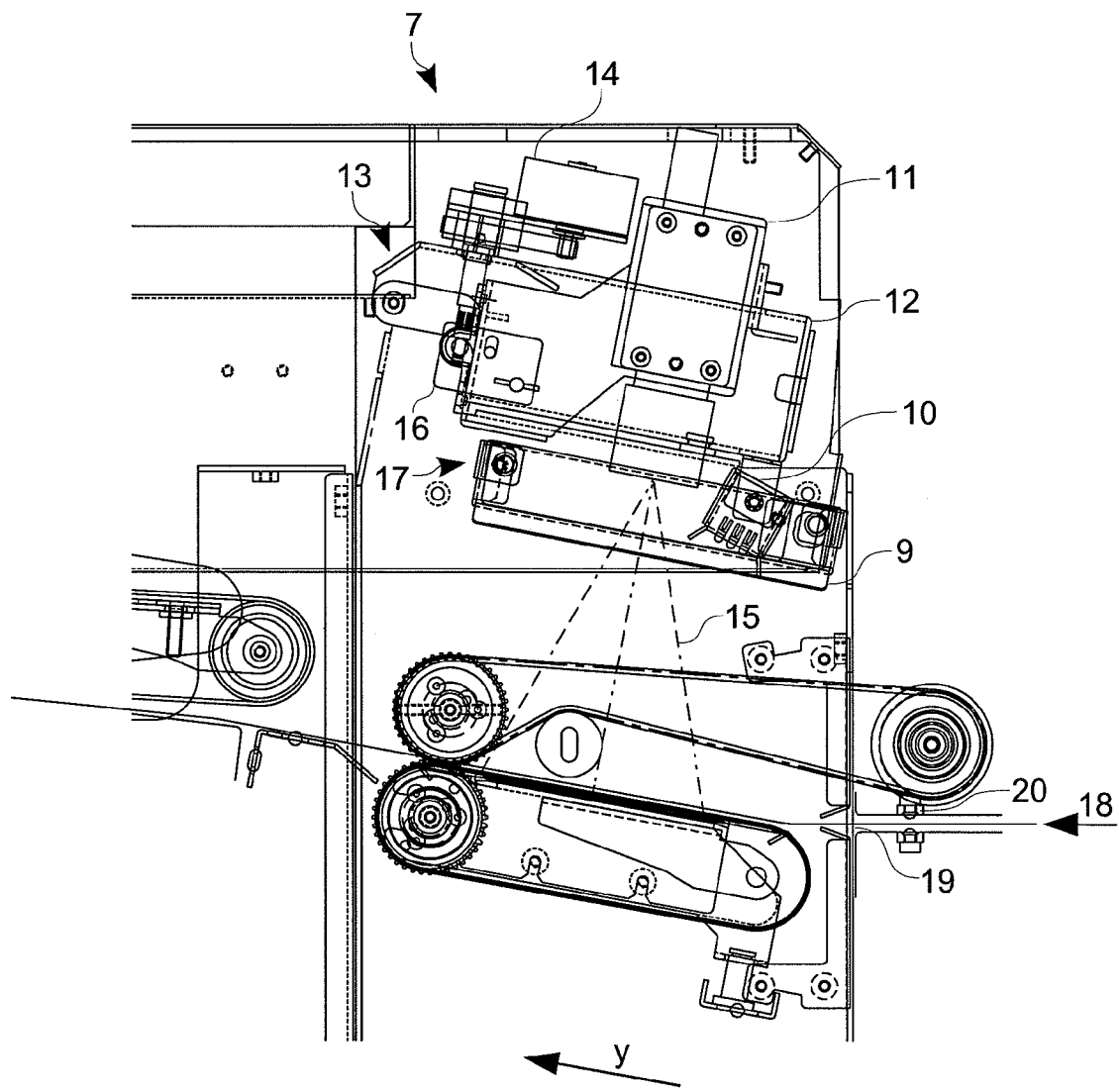
FIG. 3 is a cross-sectional view of the system of the invention taken orthogonally to the view in FIG. 2.

FIG. 3 shows the imaging station 7 in more detail. A camera 11 is fixed to a mount 12 on a cross-drive mechanism 13, driven by a motor 14 to control the position of the camera 11 relative to the side of a document, i.e. the x coordinate. The viewing angle of the camera is indicated by the triangle 15. Minor set-up adjustments can be made using adjuster 16 which comprises vertical and horizontal slots and tightening screws together with a tilt control. These adjustments would be made prior to a production run if necessary.

The illumination module 17 of FIG. 2 is fixed below the camera 11. The left side light array 9 is shown in longitudinal view and the third light array 10 in end view. The right side light array 8 is hidden from view behind the left side array 9. The light arrays are arranged so as not to obscure or interrupt the camera viewing angle 15.

The document path is shown at 18 and may be a conveyor belt driving the document into the imaging station 7 through opening 19, past a sensor 20 if appropriate for detecting any document parameters printed on the document. Alternatively the document parameters are preloaded into the machine control software.

As the document passes through the imaging station 7 the drive motor 14 moves the camera to a position, spaced from the document edge, determined by the x coordinate of the region of interest which is contained in the document parameters. The camera is automatically triggered to capture the image of the optical code at a time determined by the y coordinate, of the region of interest, which is also stored in the document parameters.

The light source may be fixed as shown or may also be controlled in this way, either by the same coordinates as for the imaging device, or different coordinates as appropriate. The light source may also be triggered to illuminate the region of interest in synchronization with the activation of the imaging device.

The invention claimed is:

1. A system for capturing an image of an optical code located at a region of interest in a document, the system comprising:
    a support for the document;
    source of light arranged to illuminate at least part of the document, the source of light being arranged to illuminate the part of the document uniformly in first and second regions at opposite side margins of the document and in a third region comprising a band joining the side margins, such that the source of light is arranged to illuminate the part of the document in an "H" shape;
    a mount for supporting an image device at a position spaced from the document;
    a trigger for activating the imaging device to capture an image of the region of interest;
    means for automatically moving the mount and operating the trigger in dependence upon at least one coordinate identifying the region of interest, the coordinate being contained in a label stored in document parameters; and
    a decoder for decoding the captured image, to read the optical code,
    wherein the source of light comprises first, second and third elongate light arrays, arranged to illuminate uniformly respective first, second and third regions of the document, and each light array is independently movable so that the relative amounts of illumination of the three regions of the document can be controlled.

2. A system according to claim 1 wherein at least two of the three light arrays are arranged to move independently of each other in dependence upon additional sets of coordinates contained in the label stored in document parameters.

3. A system according to claim 1, wherein the imaging device comprises a camera.

4. A system according to claim 1, wherein the trigger additionally controls activation of the source of light to only illuminate the region of interest when the imaging device is activated.

5. A system according to claim 1, wherein the label comprises x and y coordinates of the region of interest.

6. A system according to claim 5, wherein the y coordinate is used to control the trigger to record the image at the correct distance longitudinally of the document.

7. A system according to claim 5, wherein the x coordinate is used to position the camera at the correct distance from the edge of the document.

8. A system according to claim 1, comprising a sensor upstream of the imaging device for reading document parameters pre-printed on the document.

9. A system according to claim 1, wherein at least one document parameter is stored in the system control software.

10. A system according to claim 1, wherein document parameters are input by an operator.

11. A system according to claim 1, wherein the mount for the imaging device is attached to a cross-drive mechanism.

12. A system according to claim 1, wherein the document is supported on a moving conveyor belt.

13. A system according to claim 1, wherein the source of light is fixed in position.

14. A system according to claim 1, wherein the source of light is connected to move with the mount.

15. A system according to claim 1, wherein the source of light is arranged to move independently of the mount in dependence upon a second set of coordinates contained in the label stored in document parameters.

* * * * *